United States Patent
Yen et al.

(10) Patent No.: US 10,645,351 B2
(45) Date of Patent: May 5, 2020

(54) SMART MOTION DETECTION DEVICE AND RELATED DETERMINING METHOD

(71) Applicant: PRIMESENSOR TECHNOLOGY INC., Hsinchu County (TW)

(72) Inventors: Wen-Cheng Yen, Hsinchu County (TW); Wen-Han Yao, Hsinchu County (TW)

(73) Assignee: PRIMESENSOR TECHNOLOGY INC., Hsinchu County (TW)

( * ) Notice: Subject to any disclaimer, the term of this patent is extended or adjusted under 35 U.S.C. 154(b) by 18 days.

(21) Appl. No.: 16/018,025

(22) Filed: Jun. 25, 2018

(65) Prior Publication Data

US 2019/0199977 A1   Jun. 27, 2019

Related U.S. Application Data

(63) Continuation-in-part of application No. 15/854,697, filed on Dec. 26, 2017.

(51) Int. Cl.
*H04N 7/18*   (2006.01)
*G08B 13/196*   (2006.01)
*G06T 7/246*   (2017.01)

(52) U.S. Cl.
CPC ............ *H04N 7/188* (2013.01); *G06T 7/248* (2017.01); *G08B 13/19604* (2013.01); *H04N 7/183* (2013.01); *G06T 2207/30232* (2013.01)

(58) Field of Classification Search
None
See application file for complete search history.

(56) References Cited

U.S. PATENT DOCUMENTS

| | | | | |
|---|---|---|---|---|
| 6,388,773 B1* | 5/2002 | Smith | ..................... | H04N 1/047 358/473 |
| 7,634,662 B2* | 12/2009 | Monroe | ............. | G06K 9/00221 382/117 |
| 2015/0305114 A1* | 10/2015 | Hack | .................. | H05B 33/0896 315/153 |
| 2016/0104510 A1* | 4/2016 | Tamir | ..................... | H04N 5/222 386/223 |
| 2016/0110973 A1* | 4/2016 | Cho | ......................... | H04N 7/18 348/143 |
| 2016/0277688 A1* | 9/2016 | Gaskamp | ............... | H04N 5/332 |

* cited by examiner

*Primary Examiner* — Eileen M Adams
(74) *Attorney, Agent, or Firm* — Winston Hsu

(57) ABSTRACT

A smart motion detection device with a determining method includes a memory, a processor, and a sensor array coupled to the memory and the processor. An image captured by the sensor array is processed by the processor. The sensor array is adapted to pre-store the image into the memory when the processor is operated in the sleep mode, and the pre-stored image is transmitted to the processor when the processor is operated in the wakeup mode. The sensor array includes a comparator adapted to generate an alarm signal for switching the processor from the sleep mode to the wakeup mode in accordance with a comparison result of the pre-stored image. The determining method includes the processor analyzing images captured by the sensor array when the sensor array is activated to capture the images, and the processor analyzing images pre-stored inside the memory when the sensor array is not activated.

13 Claims, 8 Drawing Sheets

SMART MOTION DETECTION DEVICE AND RELATED DETERMINING METHOD

CROSS REFERENCE TO RELATED APPLICATIONS

This application is a continuation-in-part of U.S. patent application Ser. No. 15/854,697, filed on Dec. 26, 2017 and entitled "Motion Detection Device and Motion Detection Method Thereof." The disclosures of the prior applications are incorporated herein by reference herein in their entirety.

BACKGROUND OF THE INVENTION

1. Field of the Invention

The present invention relates to a smart motion detection device and a related determining method, and more particularly, to a smart motion detection device without losing images before wakeup of a processor and a related determining method.

2. Description of the Prior Art

Please refer to FIG. 1. FIG. 1 is a monitoring system 10 in prior art. The monitoring system 10 includes a passive detector 12 and an image detection device 14 electrically connected to an external host 16. The passive detector 12 can transmit a triggering signal to the external host 16 while detecting temperature variation, the external host 16 wakes up by the triggering signal and then actuates the image detection device 14, and the image detection device 14 executes an exposure adjustment while being actuated and starts to capture a monitoring image or to record monitoring video. Thus, even though the passive detector 12 detects the temperature variation, the image detection device 14 captures the monitoring image at a later time in relation to a transmission period of the triggering signal, wakeup periods of the external host 16 and the image detection device 14, and an exposure adjustment period of the image detection device 14, so that the monitoring system 10 cannot record the monitoring video right after the passive detector 12 detects an unusual state.

SUMMARY OF THE INVENTION

The present invention provides a smart motion detection device without losing images before wakeup of a processor and a related determining method for solving above drawbacks.

According to the claimed invention, a smart motion detection device includes a memory, a processor having a sleep mode and a wakeup mode, and a sensor array directly coupled to the memory and further electrically connected with the processor. An image captured by the sensor array is processed by the processor. The sensor array is adapted to pre-store the image into the memory when the processor is operated in the sleep mode, and the pre-stored image is received by the processor in the wakeup mode. The sensor array includes a comparator adapted to generate an alarm signal for switching the processor from the sleep mode to the wakeup mode in accordance with a comparison result of the pre-stored image.

According to the claimed invention, the smart motion detection device further includes a passive sensor electrically connected with the processor and the sensor array, and adapted to output an alarm signal for driving the sensor array to pre-store the image into the memory and switching the processor from the sleep mode to the wakeup mode. In addition, the sensor array can include a comparator adapted to compare the pre-stored image with a reference image, and the sensor array pre-stores the image into the memory when intensity variation between the pre-stored image and the reference image is greater than a predefined value.

According to the claimed invention, a smart motion detection device is capable of receiving an alarm signal to monitor motion of an object. The smart motion detection device includes a sensor array, a memory and a processor. The sensor array is adapted to capture images at a first time after receiving with the alarm signal. The memory is directly coupled to the sensor array and adapted to pre-store the captured images. The processor is coupled to the sensor array and adapted to process the captured images through the memory at a second time after receiving with the alarm signal. The second time is later than the first time.

According to the claimed invention, a determining method is applied to a smart motion detection device having a memory, a sensor array, and a processor coupled to the memory and the sensor array. The determining method includes the processor analyzing images captured by the sensor array when the sensor array is activated to capture the images, and the processor analyzing images pre-stored inside the memory when the sensor array is not activated. The processor is enabled by an alarm signal.

According to the claimed invention, the smart motion detection device includes a memory, a processor and a sensor array. The processor has a sleep mode and a wakeup mode. The sensor array is directly coupled to the memory and further electrically connected with the processor, and a plurality of images captured by the sensor array is processed by the processor. Images captured by the sensor array when the processor is operated in the sleep mode are pre-stored into the memory, and images captured by the sensor array when the processor is operated in the wakeup mode are transmitted to the processor.

According to the claimed invention, the smart motion detection device includes a memory, a processor and a sensor array. The sensor array is directly coupled to the memory and further electrically connected with the processor. The sensor array and the processor are turned off under a non-working mode. When the smart motion detection device receives a trigger signal, the sensor array directly captures and sends images to the memory before the processor sends a request to the sensor array for receiving the captured images.

The alarm signal may be generated by the sensor array or the passive sensor. The alarm signal is utilized to activate pre-storing operation of the sensor array and mode switching operation of the processor. When the alarm signal is received, the sensor array can be activated to capture the pre-stored image at a first time and the pre-stored image is transmitted to the memory. For waiting the duration of the processor switched from the sleep mode to the wakeup mode, the processor which receives the alarm signal can send a request to the sensor array for the real-time image and the pre-stored image at a second time later than the first time, so that the pre-stored image from the memory are processed later than the first time, and the real-time image is not stored into the memory but directly transmitted to the processor for the digital processing. The smart motion detection device and the related determining method of the present invention can effectively economize start-up time of the smart motion detection device without waiting for a wakeup period of the processor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
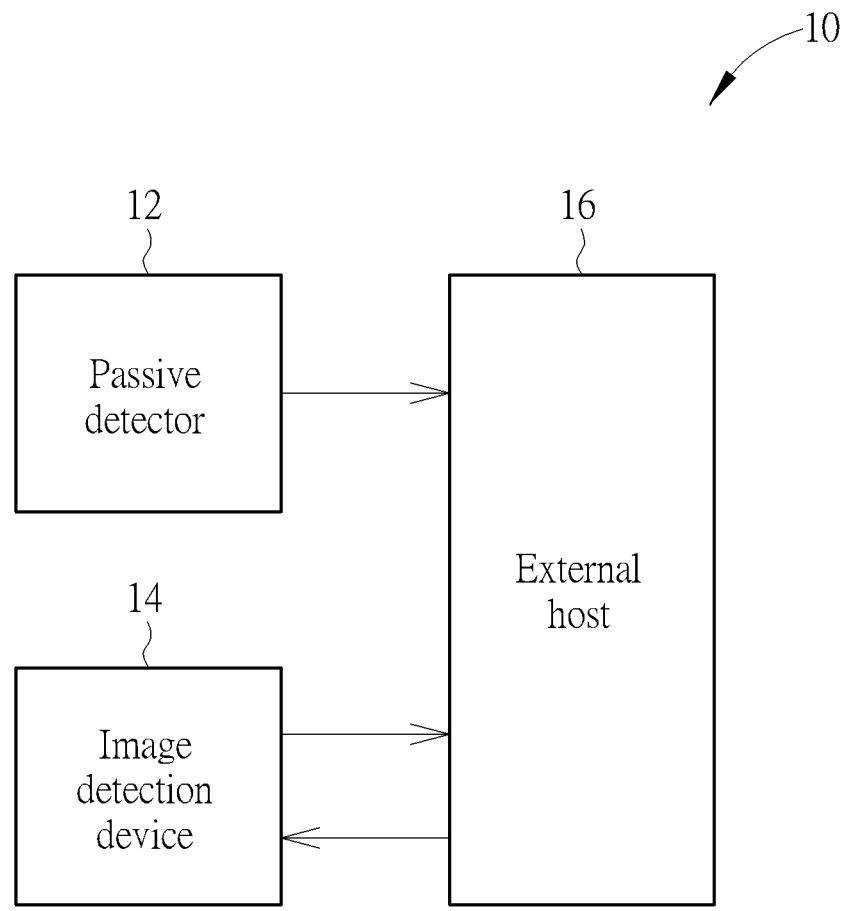
FIG. 1 is a monitoring system in prior art.
Figure 2:
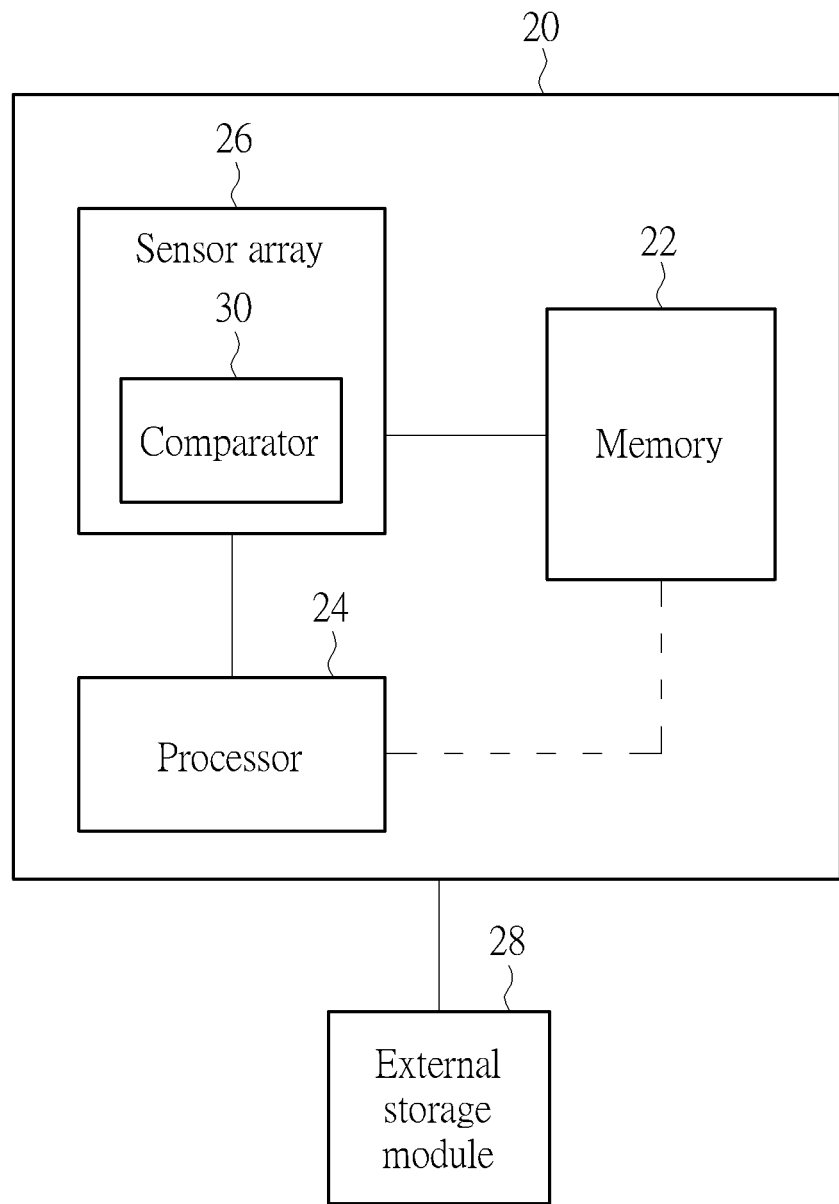
FIG. 2 is a functional block diagram of a smart motion detection device according to a first embodiment of the present invention.
Figure 3:
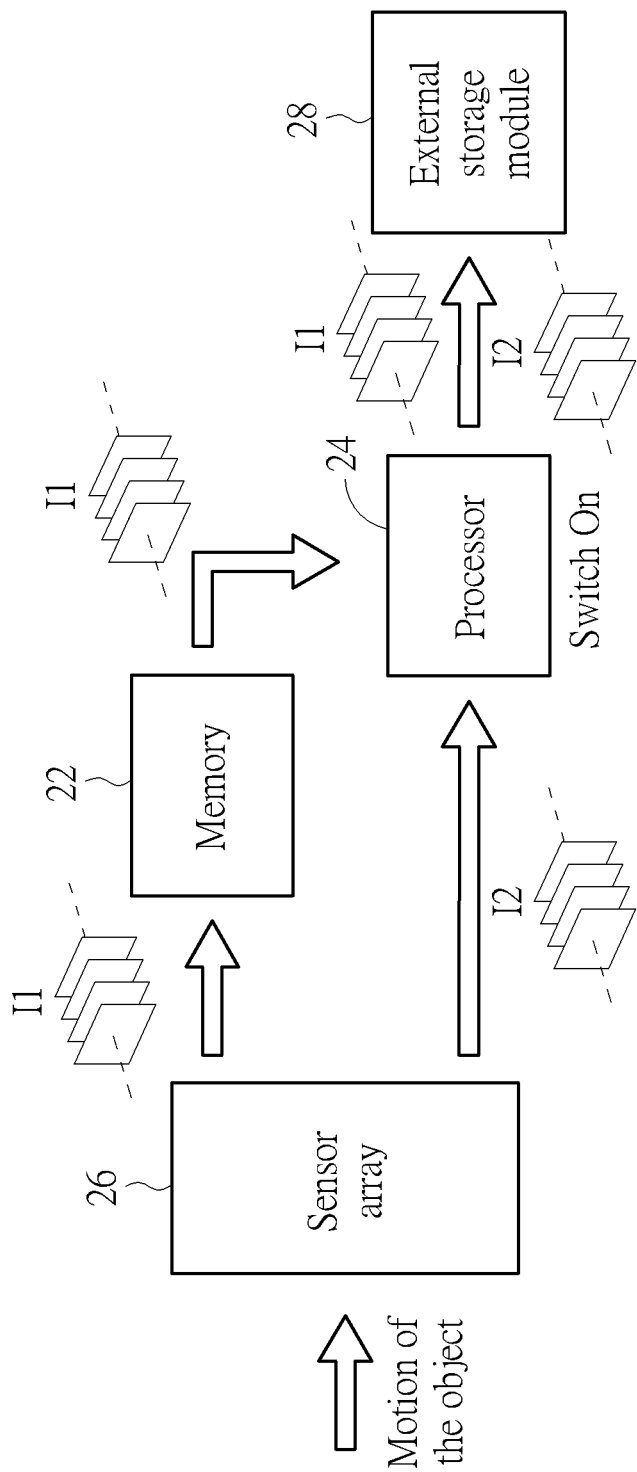
FIG. 3 is a procedural diagram of the smart motion detection device according to the first embodiment of the present invention.

Please refer to FIG. 2 and FIG. 3. FIG. 2 is a functional block diagram of a smart motion detection device 20 according to a first embodiment of the present invention. FIG. 3 is a procedural diagram of the smart motion detection device 20 according to the first embodiment of the present invention. The smart motion detection device 20 can include a memory 22, a processor 24 and a sensor array 26, which are three separate components or combined as one or two integrated components. The sensor array 26 can be directly coupled to the memory 22 and further electrically connected with the processor 24. The sensor array 26 includes a plurality of light detecting pixels arranged in two-dimension manner to capture images. The processor 24 can be switched between a sleep mode and a wakeup mode, and used to process an image captured by the sensor array 26 to identify a particular event in the captured images, such as an unexpected object been captured in the captured images.

The image captured by the sensor array 26 may be pre-stored (i.e., wrote) into the memory 22 or directly transmitted to the processor 24 in accordance with modes of the processor 24 or an alarm signal resulted from motion detection. The memory 22 can have the image capacity of predefined quantity; when the memory 22 is full and a new image is prepared to pre-store, a former image can be removed for storing the new image. The image processed by the processor 24 and the pre-stored image in the memory 22 can be transmitted to an external storage module 28 electrically connected with the smart motion detection device 20.

As the first embodiment shown in FIG. 3, the processor 24 stays in the sleep mode when the smart motion detection device 20 is not activated. The sensor array 26 can include a comparator 30 adapted to generate the alarm signal when monitoring motion of an object. As the processor 24 is operated in the sleep mode, the sensor array 26 continuously or intermittently captures a plurality of images (such as capture five images in every 1 second), and the plurality of images are pre-stored into the memory 22; in the meantime, the comparator 30 reads and compares at least some of the pre-stored images I1 with a reference image. When intensity variation between one of the pre-stored images I1 and the reference image is smaller than a predefined value, the processor 24 keeps in the sleep mode and the comparator 30 reads the next pre-stored image I1 for a comparison with the reference image. When the intensity variation is greater than the predefined value, the comparator 30 can generate the alarm signal utilized to awake the processor 24 and further to pre-store the image captured by the sensor array 26 into the memory 22. That is, the alarm signal is used to switch the processor 24 from the sleep mode to the wakeup mode.

There has variety ways for the comparator 30 to compare the pre-stored images I1 and the reference image, for example the comparator 30 could compare whole image range or only compare partial pixels for the pre-stored images I1 and the reference image. The comparator 30 could compare intensity summation of all pixels or partial pixels, in another way the comparator 30 could compare intensity of each pixel in whole image range or only partial pixels.

When the processor 24 is operated in the wakeup mode, a real-time image I2 captured by the sensor array 26 is directly transmitted to the processor 24 for digital processing and may not be stored into the memory 22. The processor 24 in the wakeup mode may process the real-time image I2 and receive the pre-stored image I1 in the memory 22 by turns, or may receive the pre-stored image I1 after processing of the real-time image I2. A process of the real-time image I2 can precede that of the pre-stored image I1, so the smart motion detection device 20 is able to focus on an instant situation within the monitoring area. The process of the pre-stored image I1 may be executed when the process of the real-time image I2 is completed or paused. If an operating capability of the processor 24 is sufficient for mass data, the real-time image I2 and the pre-stored image I1 can be processed alternately, hence the smart motion detection device 20 can show detection results about the current and previous period at the same time.

In some embodiments, the pre-stored images captured by the sensor array 26 when the processor 24 is operated in the sleep mode can be pre-stored into the memory 22, and the real-time images captured by the sensor array 26 when the processor 24 is operated in the wakeup mode can be transmitted to the processor 24. In other embodiments, the processor 24 and the sensor array 26 can be turned off under a non-working mode; when the smart motion detection device 20 receives a trigger signal, the sensor array 26 can capture and send the images to the memory 22 directly, and then the processor 24 can send a request to the sensor array 26 for receiving the captured images. The trigger signal may be an alarm resulted from an external unit or a built-in unit of the smart motion detection device 20.

In addition, at least one of an image quality and a frame rate of the sensor array 26 may be changed when the processor 24 is operated in the sleep mode or the wakeup mode. For example, as the processor 24 is in the sleep mode, the sensor array 26 can capture the low-quality image or capture the image in the low frame rate for comparing with the reference image. Transmission bandwidth and storage capability are economized accordingly. The alarm signal is generated because the intensity variation between the low-quality image (or the image captured in the low frame rate) and the reference image is greater than the predefined value, so that the sensor array 26 starts to capture the high-quality image or capture the image in the high frame rate for pre-storing into the memory 22, and simultaneously the processor 24 can be switched to the wakeup mode. Then, the pre-stored high-quality image or the pre-stored image captured in the high frame rate in the memory 22 is transmitted to the processor 24 operated in the wakeup mode; therefore the smart motion detection device 20 does not lose image information before the processor 24 is in the wakeup mode.

Figure 4:
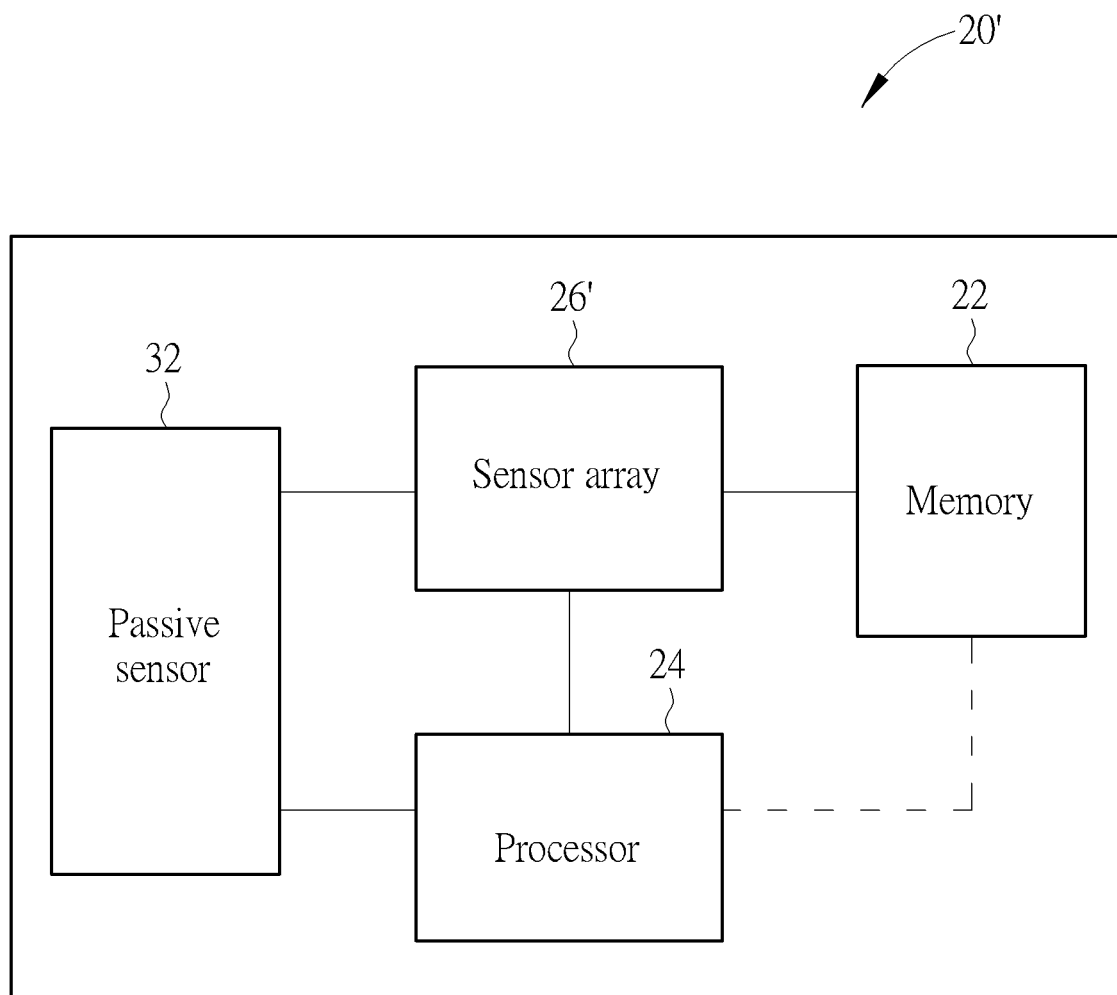
FIG. 4 is a functional diagram of the smart motion detection device according to a second embodiment of the present invention.
Figure 5:
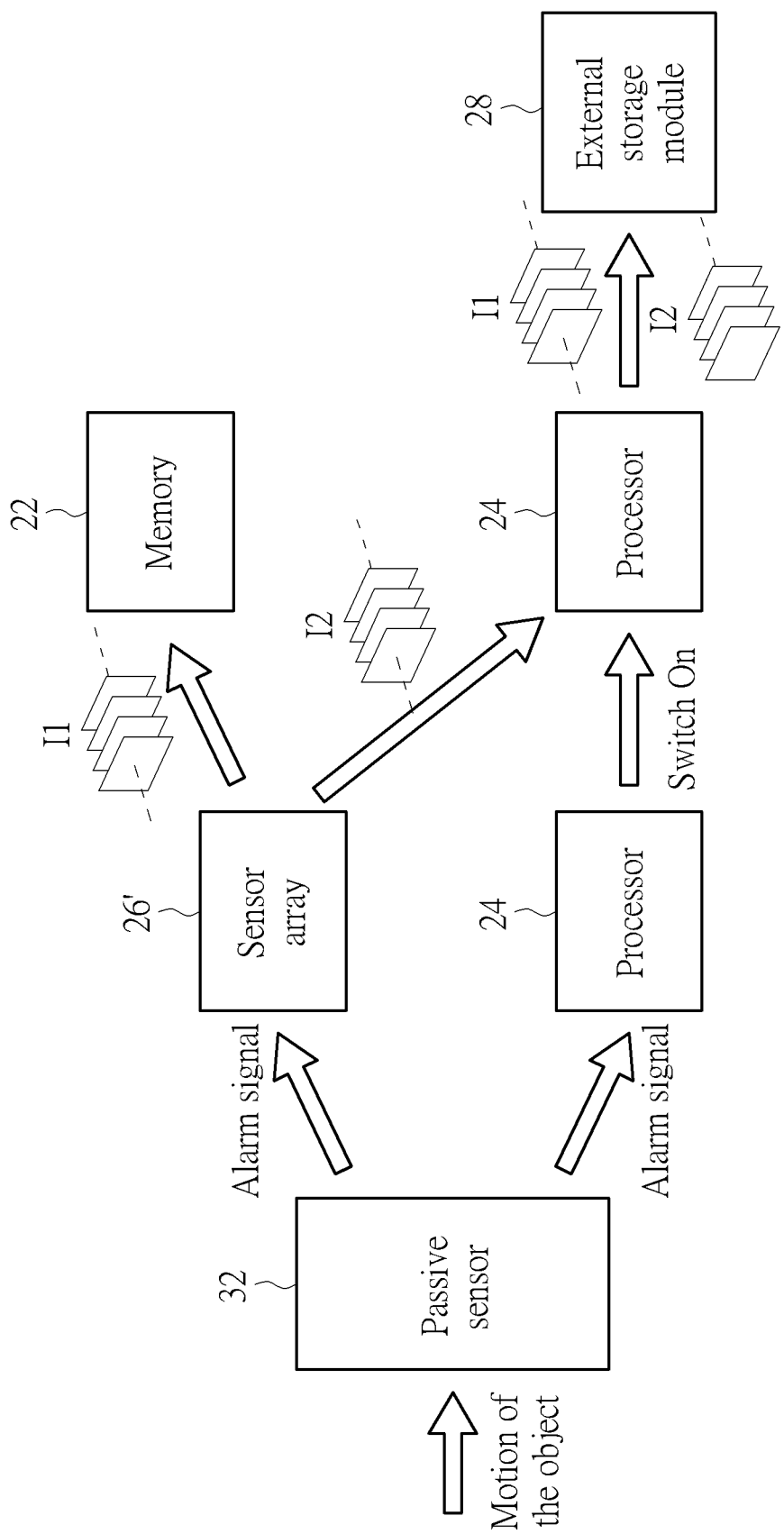
FIG. 5 is a procedural diagram of the smart motion detection device according to the second embodiment of the present invention.
Figure 6:
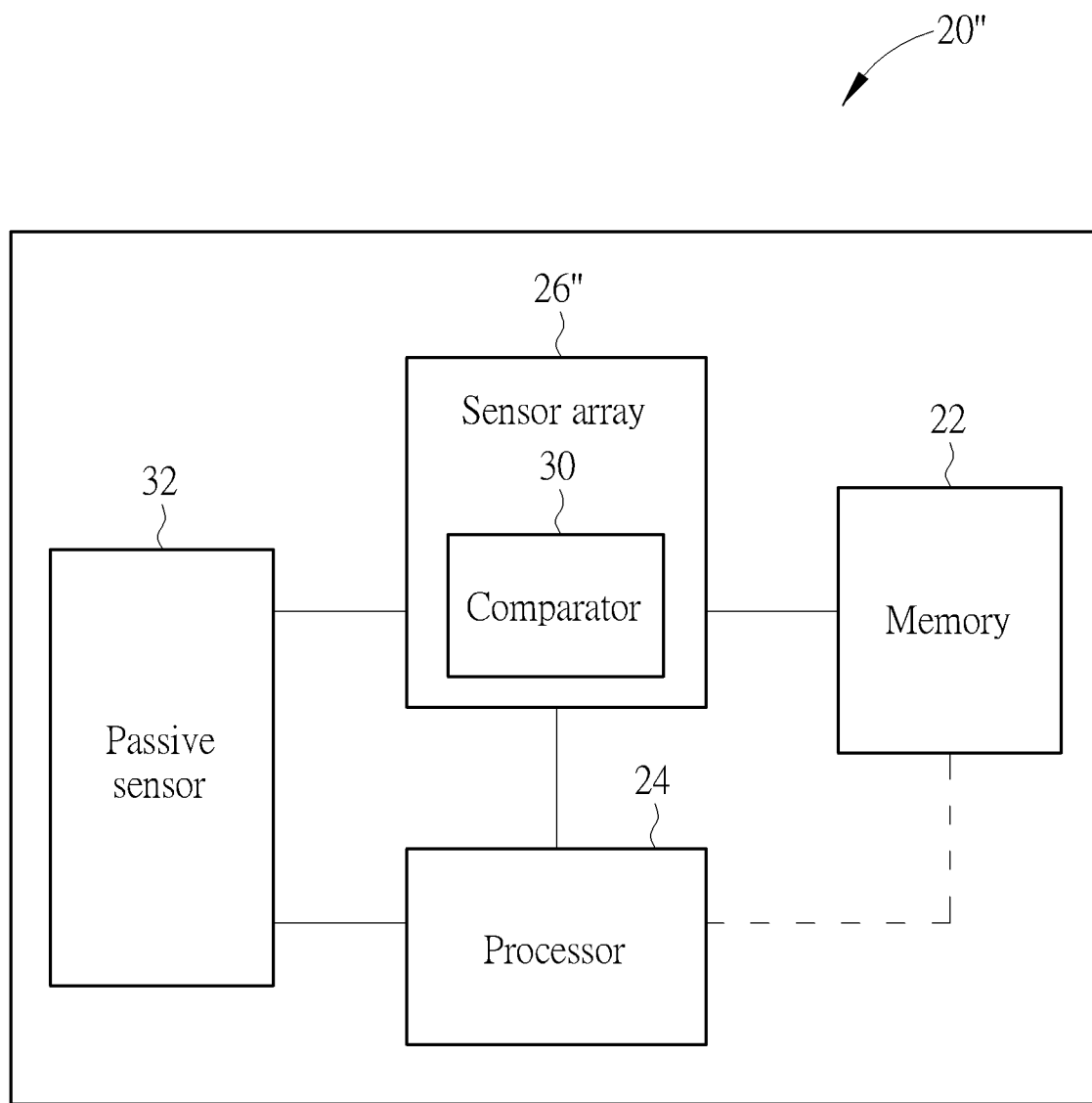
FIG. 6 is a functional diagram of the smart motion detection device according to a third embodiment of the present invention.
Figure 7:
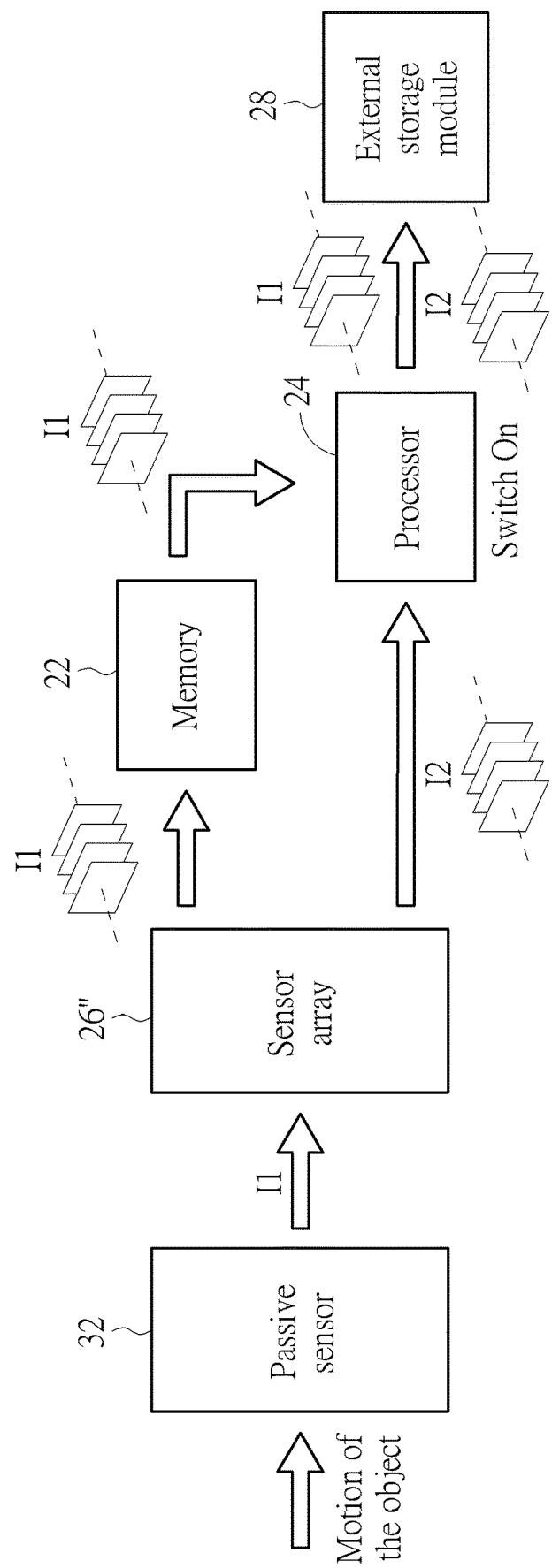
FIG. 7 is a procedural diagram of the smart motion detection device according to the third embodiment of the present invention.

Please refer to FIG. 4 to FIG. 7. FIG. 4 is a functional diagram of the smart motion detection device 20' according to a second embodiment of the present invention. FIG. 5 is a procedural diagram of the smart motion detection device 20' according to the second embodiment of the present invention. FIG. 6 is a functional diagram of the smart motion detection device 20" according to a third embodiment of the present invention. FIG. 7 is a procedural diagram of the smart motion detection device 20" according to the third embodiment of the present invention. In the embodiments, elements having the same numerals as ones of the first embodiment have the same functions, and a detailed description is omitted herein for simplicity.

In a possible embodiment, the smart motion detection device 20' can include the memory 22, the processor 24, the sensor array 26' and a passive sensor 32. The passive sensor 32 is electrically connected with the processor 24 and the sensor array 26'. The processor 24 is kept in the sleep mode and the sensor array 26' is shut down when the passive sensor 32 does not detect any abnormal situation. As the passive sensor 32 detects the motion of the object, the passive sensor 32 can generate the alarm signal, and the alarm signal is used to drive the sensor array 26' and switch the processor 24 from the sleep mode to the wakeup mode. When the processor 24 is still in the sleep mode, the sensor array 26' can capture and transmit the pre-stored image I1 to the memory 22. When the processor 24 is operated in the wakeup mode, the sensor array 26' can capture and transmit the real-time image I2 to the processor 24, and the pre-stored image I1 in the memory 22 can be transmitted to the processor 24 accordingly.

The smart motion detection device 20 may have the non-working mode. The processor 24 and the sensor array 26' can be turned off under the non-working mode. As the passive sensor 32 detects the motion of the object and generates the alarm signal, the sensor array 26' is triggered by the alarm signal and starts to capture and send the pre-stored image into the memory 22. After that, the processor 24 can be switched to the wakeup mode and then sends the request to the sensor array 26' for receiving the pre-stored image.

In another possible embodiment, the smart motion detection device 20" can include the memory 22, the processor 24, the sensor array 26" having the comparator 30, and the passive sensor 32. The passive sensor 32 can activate the sensor array 26" when detecting the abnormal situation. The activated sensor array 26" can capture and transmit the pre-stored image I1 to the memory 22, and the comparator 30 can compare the pre-stored image I1 with the reference image for determining whether to switch on the processor 24. The comparator 30 is utilized to identify the abnormal situation. If the intensity variation between the pre-stored image I1 and the reference image is smaller than the predefined value, the abnormal situation may be resulted from noise and the processor 24 is not switched on. If the intensity variation is greater than the predefined value, the abnormal situation can be defined as someone or something intruding into the monitoring area of the smart motion detection device, so that the processor 24 is switched to the wakeup mode for recording. As the processor 24 is operated in the wakeup mode, the real-time image I2 captured by the sensor array 26" and the pre-stored image I1 in the memory 22 can be transmitted to the processor 24 and then to the external storage module 28 for the digital processing.

Figure 8:
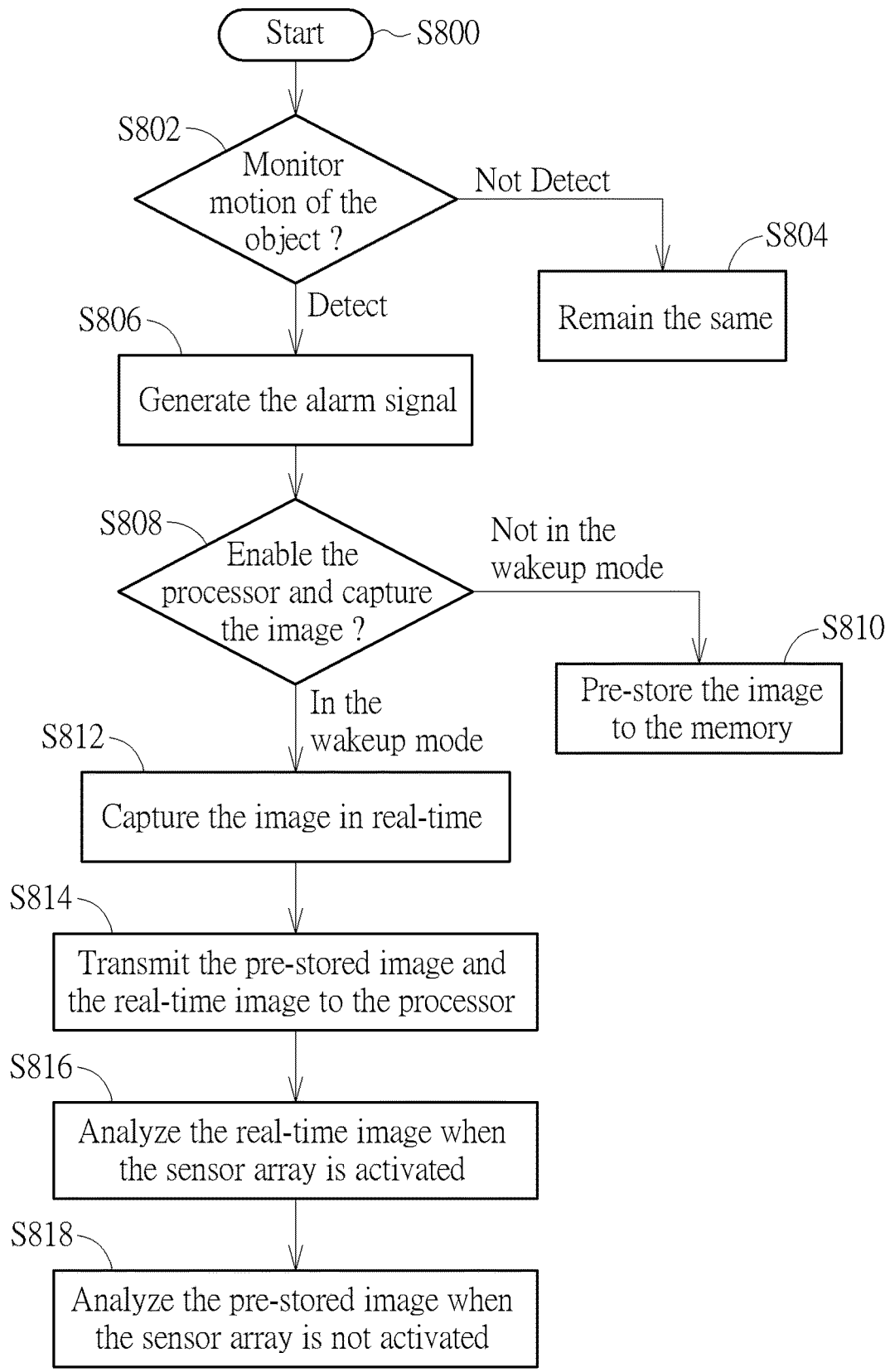
FIG. 8 is a flow char of a determining method according to the embodiment of the present invention.

Please refer to FIG. 8. FIG. 8 is a flow char of a determining method according to the embodiment of the present invention. The determining method illustrated in FIG. 8 can be suitable for the smart motion detection devices shown in FIG. 2 to FIG. 7. First, steps S800 and S802 are executed to start the determining method and to monitor the motion of the object. The said monitoring function can be applied by the sensor array 26, 26' and 26" or the passive sensor 32. As there is not abnormal situation, step S804 is executed to keep the processor 24 in the sleep mode; as the motion of the object is detected, steps S806 and S808 are executed to generate the alarm signal for enabling the processor 24 and capturing the image via the sensor array 26, 26' and 26". When the processor 24 is not operated in the wakeup mode, step S810 is executed that the sensor array 26, 26' or 26" can produce the pre-stored image I1 in the memory 22. When the processor 24 is operated in the wakeup mode, steps S812 and S814 are executed that the sensor array 26, 26' or 26" can produce the real-time image I2, and both the pre-stored image I1 and the real-time image I2 can be transmitted to the processor 24.

After that, step S816 is executed that the processor 24 can analyze the real-time image I2 captured by the sensor array 26, 26' or 26" when capturing function of the sensor array 26, 26' or 26" is activated. When the sensor array 26, 26' or 26" is not activated, probably owning to the disappeared object or any other situations, step S818 is executed to analyze the pre-stored image I1 inside the memory 22 by the processor 24. It should be mentioned that the processor 24 not only can process the real-time image I2 before the pre-stored image I1, but also alternately process the pre-stored image I1 and real-time image I2 in accordance with the user's actual demand and the sufficient operating capability.

In conclusion, the alarm signal may be generated by the sensor array or the passive sensor (which can be a thermal sensor, an accelerometer or a gyro). The alarm signal is utilized to activate pre-storing operation of the sensor array and mode switching operation of the processor. When the alarm signal is received, the sensor array can be activated to capture the pre-stored image at a first time and the pre-stored image is transmitted to the memory. For waiting a duration of the processor switched from the sleep mode to the wakeup mode, the processor which receives the alarm signal can send a request to the sensor array for the real-time image and the pre-stored image at a second time later than the first time, so that the pre-stored image from the memory are processed later than the first time, and the real-time image is not stored into the memory but directly transmitted to the processor for the digital processing. Comparing to the prior art, the smart motion detection device and the related determining method of the present invention can effectively economize start-up time of the smart motion detection device without waiting for a wakeup period of the processor.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A smart motion detection device, comprising:
   a memory;
   a processor having a sleep mode and a wakeup mode; and
   a sensor array directly coupled to the memory and further electrically connected with the processor, an image captured by the sensor array being processed by the processor, the sensor array being adapted to pre-store the image into the memory when the processor is operated in the sleep mode, and the pre-stored image being received by the processor in the wakeup mode, the sensor array comprising a comparator adapted to generate an alarm signal for switching the processor from the sleep mode to the wakeup mode in accordance with a comparison result of the pre-stored image, wherein the processor is awakened by the comparator when the comparator compares the pre-stored image with a reference image and intensity variation between the pre-stored image and the reference image is greater than a predefined value.

2. The smart motion detection device of claim 1, wherein when the processor is operated in the wakeup mode, the image captured by the sensor array is directly transmitted to the processor.

3. The smart motion detection device of claim 1, wherein the image processed by the processor and the pre-stored image in the memory are transmitted to an external storage module electrically connected with the smart motion detection device.

4. The smart motion detection device of claim 1, wherein when the processor is operated in the wakeup mode, a real-time image captured by the sensor array is processed before a process of the pre-stored image.

5. The smart motion detection device of claim 1, wherein when the processor is operated in the wakeup mode, the pre-stored image and a real-time image captured by the sensor array are processed alternately.

6. The smart motion detection device of claim 1, wherein an image quality of the sensor array is changed when the processor is operated in the sleep mode or the wakeup mode.

7. The smart motion detection device of claim 1, wherein a frame rate the sensor array is changed when the processor is operated in the sleep mode or the wakeup mode.

8. The smart motion detection device of claim 1, further comprising:
   a passive sensor electrically connected with the processor and the sensor array, and adapted to output an alarm signal for driving the sensor array to pre-store the image into the memory and switching the processor from the sleep mode to the wakeup mode.

9. The smart motion detection device of claim 8, wherein the sensor array comprises a comparator adapted to compare the pre-stored image with a reference image, the sensor array pre-stores the image into the memory when intensity variation between the pre-stored image and the reference image is greater than a predefined value.

10. The smart motion detection device of claim 8, wherein the alarm signal is utilized to activate pre-storing operation of the sensor array and mode switching operation of the processor simultaneously.

11. The smart motion detection device of claim 8, wherein the passive sensor is a thermal sensor, an accelerometer or a gyro.

12. A smart motion detection device, comprising:
    a memory;
    a processor having a sleep mode and a wakeup mode; and
    a sensor array directly coupled to the memory and further electrically connected with the processor, an image captured by the sensor array being processed by the processor, the sensor array being adapted to pre-store the image into the memory when the processor is operated in the sleep mode, and the pre-stored image being received by the processor in the wakeup mode, wherein the sensor array comprises a comparator adapted to compare the pre-stored image with a reference image, the sensor array pre-stores the image into the memory when intensity variation between the pre-stored image and the reference image is greater than a predefined value.

13. A smart motion detection device, comprising:
    a memory;
    a processor having a sleep mode and a wakeup mode; and
    a sensor array directly coupled to the memory and further electrically connected with the processor, an image captured by the sensor array being processed by the processor, the sensor array being adapted to pre-store the image into the memory when the processor is operated in the sleep mode, and the pre-stored image being received by the processor in the wakeup mode, wherein an alarm signal output by a passive sensor of the smart motion detection device is utilized to activate pre-storing operation of the sensor array and mode switching operation of the processor simultaneously.

* * * * *